E. W. KAISER.
AUTOMOBILE BUMPER.
APPLICATION FILED JULY 19, 1919.
1,328,283.
Patented Jan. 20, 1920.
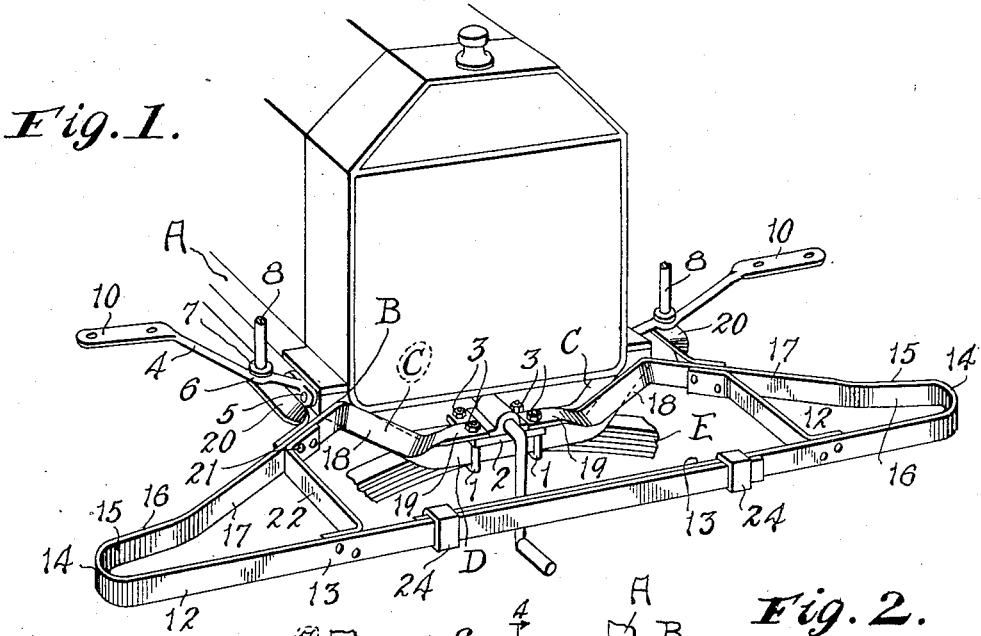
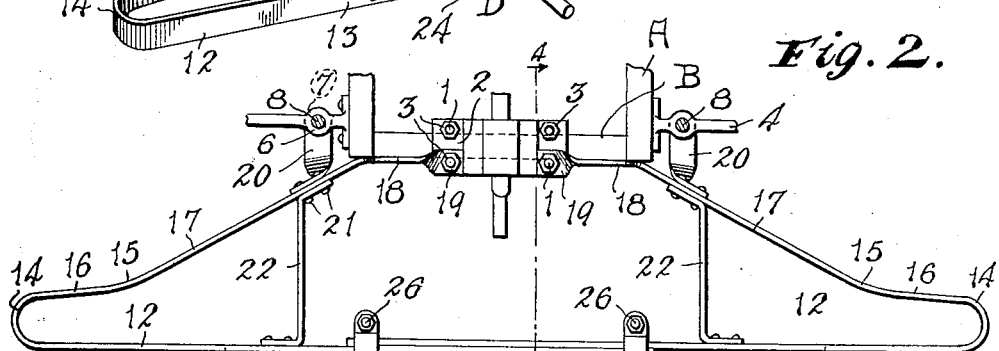
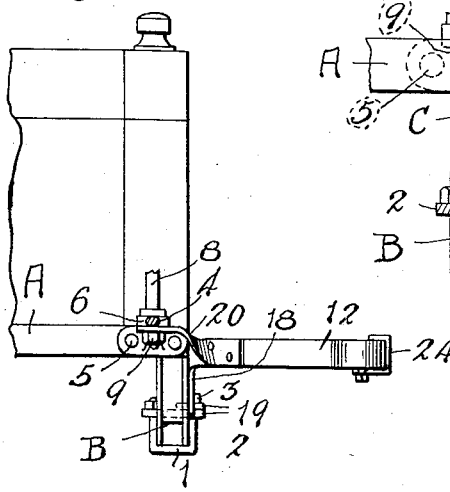
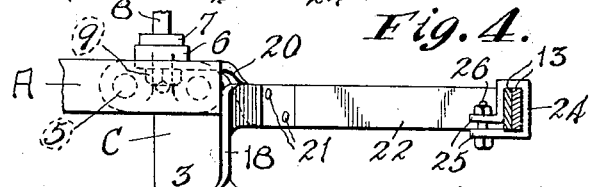
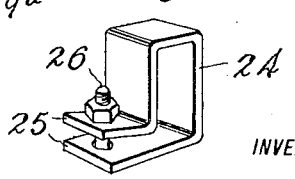
INVENTOR;
Emanuel W. Kaiser,
Russell M. Everett,
ATTORNEY

UNITED STATES PATENT OFFICE.

EMANUEL W. KAISER, OF NEWARK, NEW JERSEY.

AUTOMOBILE-BUMPER.

1,328,283. Specification of Letters Patent. Patented Jan. 20, 1920.

Application filed July 19, 1919. Serial No. 312,040.

*To all whom it may concern:*

Be it known that I, EMANUEL W. KAISER, a citizen of the United States, and a resident of Newark, in the county of Essex and State of New Jersey, have invented new and useful Improvements in Automobile-Bumpers, of which the following is a specification.

This invention relates to fenders or bumpers for motor vehicles such as are utilized to protect the vehicle from injury or minimize the damage in the event of a collision with another vehicle or object.

One object of the invention is to provide a bumper or fender for motor vehicles which is simple and inexpensive in construction and which can be easily and quickly applied to a vehicle chassis without alteration of the vehicle and without the use of special and complicated attaching means.

Further objects of the invention are to provide a fender of the character described which will withstand enormous shocks or blows; which is constructed to be applied to a vehicle so that little or no strain is put upon the attaching members or delicate parts of the vehicle when the fender encounters an object; which comprises a minimum number of parts and at the same time thoroughly absorbs the shocks incident to a collision; and which can be easily and quickly repaired and straightened if damaged.

For a full understanding of the invention reference is to be had to the following description and accompanying drawing in which:

Figure 1 is a perspective view of a fender constructed in accordance with the invention, showing the manner of applying the same to a conventional type of motor vehicle, only so much of the vehicle being shown as is necessary to illustrate the invention;

Fig. 2 is a top plan view thereof;

Fig. 3 is a side elevation of the fender and the front of the vehicle;

Fig. 4 is an enlarged sectional view on the line 4—4 of Fig. 2,

Fig. 5 is a detached perspective view of one of the clips for securing the sections of the fender together.

Corresponding and like parts are referred to in the following description and indicated in all views of the drawing by the same reference characters.

Specifically describing the present embodiment of the invention, the reference character A designates the front portion of the chassis of a conventional type of motor vehicle, the said chassis being provided with a transversely extending front channel bar B which is formed with the downwardly and inwardly converging portions C which merge into a horizontal portion D adapted to receive the front vehicle spring E. The spring E is secured to the channel bar B by means of a pair of spaced U-bolts 1 which straddle the bar and spring, as clearly illustrated by Fig. 4, and project upwardly through a plate 2, nuts 3 being screwed upon the ends of the bolts and tight upon the top of the plate 2, thus securely fastening the spring E to the channel bar B. Wheel fender or mud-guard brackets 4 are secured to the side bars of the chassis A by means of suitable fastening members 5, and intermediate their lengths are provided with enlarged perforated seats 6 adapted to receive the shoulders 7 on the lamp standards 8, the lower ends of the lamp standards passing through the openings in the seats 6 and receiving nuts 9 for securing the lamp standards to the mud-guard brackets. The outer ends 10 of the mud-guard brackets are adapted to be secured to the mud-guards (not shown). All of the foregoing construction is conventional and no claim for novelty is made upon it.

The fender or bumper 11 may be formed of any suitable material, but in the present instance is shown as constructed of resilient strap metal which will withstand and absorb violent shocks without permanent deformation. The fender is constructed in two similarly but oppositely formed sections 12, each of said sections being substantially U-shaped and having a long straight impact receiving bar 13 which is disposed transversely of the vehicle and spaced from the front thereof. This bar is of a length sufficient to extend across the front of one wheel and the chassis. An integral loop 14 joins the impact receiving bar 13 to a spring supporting and shock absorbing leg 15 which is of an irregular formation, being provided with a short and inwardly extending portion 16 which slightly diverges rearwardly from the impact receiving bar 13. At the inner end of the portion 16 the leg 15 is bent to form a longer straight portion 17 which extends rearwardly at an angle to the portion 16, the inner end of said portion 17 terminating in an integral bearing and attaching foot 18 which is disposed in a plane substantially parallel with the impact receiving bar 13. This bearing foot 18 is bent downwardly and inwardly out of the horizontal plane of the fender and is adapted to extend along and bear snugly against the downwardly converging portion C of the front channel bar B of the chassis, the end of the foot 18 being twisted at 19 into a plane at right angles to the plane of the foot and provided with an opening 19ª adapted to fit over one end of the corresponding U-bolt 1. A bracket or lug 20 formed of the same material as above described has one end thereof secured to the spring-supporting leg 15 by suitable fastening members such as the rivets 21, the other end of said bracket 20 being twisted into a horizontal plane and provided with an opening adapted to receive the lower end of the lamp standard 8. A brace 22 of strap metal extends transversely of the fender and has one end thereof secured to the spring-supporting leg 15 by the same fastening members 21 as the bracket 20, the other end being bent and secured to the impact receiving bar 13 by fastening members 23. The brace 22 is arranged in substantial alinement with the bracket 20 and slightly outside the side bar of the chassis A, at substantially right angles to the impact-receiving bar 13.

In assembling the fender the two sections are fitted together with the free ends of the impact-receiving bars 13 overlapping, and with the loops 14 opening inwardly, as shown in Fig. 2. The ends of the impact-receiving bars are then clamped together by means of clips 24 one of which is arranged near the end of each bar 13 and extends around both of said bars 13. These clips are similarly formed, and comprise a single piece of spring strap metal bent into the form of a rectangular closed loop, the ends 25 thereof being extended outwardly and connected by a bolt 26. The ends 25 preferably converge slightly inwardly toward the side of the slip as shown by Fig. 5, so that as the bolt 26 is tightened the sides of the clip are drawn inwardly toward each other to firmly grip the impact-receiving bars 13.

In applying the fender to a motor vehicle the sections 12 are adjusted relatively to each other so that the distance between the openings 19ª in the bearing feet 18 is the same as the distance between the two U-bolts 1. One nut 3 of each bolt is then removed and the ends 19 of the feet 18 slipped over the ends of the corresponding bolts 1, after which the nuts are replaced and screwed down to clamp the feet 18 between them and the spring plate 2. The nuts 9 on the lower ends of the lamp standards are then removed and the brackets 20 fitted over the lower ends of the standards, the nuts 9 being then replaced to clamp the brackets 20 to the mud-guard brackets 4.

With this construction, it will be seen that the two impact-receiving bars coöperate to form an impact-receiving member which extends entirely across the front wheels and chassis of the vehicle, the said member being of double thickness at the center where the shocks are liable to be greatest. Further, it will be noted that the loops 14 and spring-supporting legs 15 having the peculiar irregular formation above described, which increases their resiliency, will effectively and almost wholly absorb the lighter shocks. The bearing feet 18 have a snug engagement with the front transverse channel bar B, so that all shocks will be transmitted to the chassis of the vehicle, thus relieving the attaching members 1 and 8 of all strain. The braces 22, being interposed between the spring-supporting legs 15 and the impact-receiving bar, will also absorb some of the shocks, and prevent deformation or collapsing of the impact-receiving bar.

While I have illustrated and described one possible embodiment of my invention, it will be obvious that various detail modifications and changes may be made without departing from the spirit or scope of the invention, and I do not wish to be understood as limiting myself except as required by the following claims when construed in the light of the prior art.

Having thus described the invention, what I claim is:

1. A vehicle fender, including an impact receiving member extending transversely of the vehicle chassis and wheels and spaced therefrom, each end of said impact receiving member being provided with a rearwardly extending supporting leg, which has a direct bearing upon said chassis, and means disposed upon opposite sides of each of said supporting legs and at opposite ends of said bearing for supporting the fender on a vehicle.

2. A vehicle fender, including an impact-receiving member extending transversely of the vehicle chassis and wheels and spaced therefrom, each end of said impact-receiving member having a rearwardly extending supporting leg which has an extended and direct bearing upon the said chassis, and means disposed upon opposite sides of each of said supporting legs for supporting the fender upon the vehicle.

3. A vehicle fender, including an impact receiving member extending transversely of the vehicle chassis and wheels and spaced therefrom, each end of said impact receiving member being provided with a rearwardly extending supporting leg, each of said supporting legs being provided with a bearing foot arranged substantially parallel to said impact receiving member and having a direct bearing upon the chassis of a vehicle, and fastening means arranged at each end of each of said feet beyond the bearing surface for supporting the fender on the vehicle.

4. A vehicle fender, including an impact receiving member extending transversely of the vehicle chassis and wheels and spaced therefrom, each end of said impact receiving member being provided with a rearwardly extending supporting leg arranged at an angle to said impact receiving member, said supporting legs being provided with bearing feet which are disposed in substantial alinement with each other and have a direct bearing upon the vehicle chassis, and means for fastening said feet at their adjacent and opposite ends to said vehicle chassis for supporting the fender thereon.

5. A vehicle fender, including an impact-receiving member extending transversely of the vehicle chassis and wheels and spaced therefrom, said impact-receiving member having a bearing foot which has an extended and direct bearing against the vehicle chassis, and fastening means arranged at each end of said foot beyond its bearing surface for supporting the fender on the vehicle.

6. A vehicle fender, including an impact-receiving member extending transversely across the vehicle chassis and wheels and spaced therefrom, each end of said impact-receiving member being provided with a rearwardly extending supporting leg which is disposed at an angle to said impact-receiving member, said supporting legs being provided with bearing feet which are arranged in a plane substantially parallel to the impact-receiving member, means for fastening said feet to the chassis of the vehicle, and means connected to the supporting arms and secured to the vehicle.

7. The combination with a vehicle chassis having spring clip bolts at the end thereof for securing the spring to the chassis, a mud-guard bracket secured to the chassis and provided with means for receiving a vertical lamp standard, said standard having a threaded lower end extending through the said mud-guard bracket and a nut on said threaded end, of a fender comprising an impact-receiving member extending transversely across the vehicle chassis and wheels and spaced therefrom, a supporting leg extending rearwardly from said impact-receiving member, and means for securing said supporting leg to the beforementioned spring clip bolt and the lower end of said lamp standard.

8. A vehicle fender including an impact-receiving member extending transversely across the vehicle chassis and wheels and spaced therefrom, a rearwardly extending supporting leg connected to each end of said impact-receiving member and disposed at an angle thereto, a foot arranged at the end of said supporting leg and disposed in a plane substantially parallel with the impact-receiving bar, said foot being provided with an opening to receive a fastening member for securing the fender to the vehicle chassis, and a rearwardly-extending bracket connected to each of said supporting legs and disposed at substantially right angles to said foot, each of said brackets being provided with an opening to receive another fastening member.

9. A vehicle fender including an impact receiving member extending transversely of the vehicle and wheels and spaced therefrom, each end of said impact receiving member having a rearwardly extending supporting leg, means for fastening said legs to the vehicle chassis, and braces interposed between said impact receiving member and each of said legs.

10. A vehicle fender including an impact receiving member extending transversely of the vehicle and wheels and spaced therefrom, the ends of said impact receiving member having rearwardly extending inwardly converging supporting legs, means for fastening said legs to the vehicle chassis, and braces interposed between the said impact receiving member and each of said supporting legs.

EMANUEL W. KAISER.